United States Patent
Nakagaki et al.

[11] Patent Number: 6,145,802
[45] Date of Patent: Nov. 14, 2000

[54] FLUID-SEALED TYPE VIBRATION ISOLATING APPARATUS

[75] Inventors: Osamu Nakagaki, Ichinomiya; Tatsuo Suzuki; Norihiro Yamada, both of Inazawa; Tetsuo Asano, Komaki; Hisayoshi Kato, Toyota, all of Japan

[73] Assignee: Toyoda Gosei Co., Ltd., Nishikasugai-gun, Japan

[21] Appl. No.: 09/304,839

[22] Filed: May 5, 1999

[30] Foreign Application Priority Data

Jun. 9, 1998 [JP] Japan .................................. 10-161169
Dec. 15, 1998 [JP] Japan .................................. 10-355615

[51] Int. Cl.$^7$ ....................................................... F16M 1/00
[52] U.S. Cl. ............................ 248/638; 248/636; 248/562
[58] Field of Search .................................. 248/638, 636, 248/631, 562, 566, 559

[56] References Cited

U.S. PATENT DOCUMENTS

| | | | |
|---|---|---|---|
| 4,802,648 | 2/1989 | Decker et al. | 248/638 X |
| 4,826,126 | 5/1989 | Katayama et al. | 248/636 X |
| 5,246,212 | 9/1993 | Funahashi et al. | 248/636 X |
| 5,314,173 | 5/1994 | Ide et al. | 248/562 X |
| 5,370,375 | 12/1994 | Kojima | 248/636 X |

FOREIGN PATENT DOCUMENTS

9-49541 2/1997 Japan .

*Primary Examiner*—Ramon O. Ramirez
*Assistant Examiner*—A. Joseph Wujciak
*Attorney, Agent, or Firm*—IP Group of Pillsbury Madison & Sutro LLP

[57] ABSTRACT

A vibrating mechanism section comprises an oscillator comprising a vibration coil, a movable iron piece, a stator iron core, a movable shaft, a return spring and so on; a vibration diaphragm driven by the oscillator; and an air pressure generating chamber in which a pulsating air pressure is produced by the vibration diaphragm. The oscillator is provided with a temperature sensor. A vibration isolating mechanism section comprises an insulator; a fluid chamber comprising a main chamber, a sub-chamber, a first orifice and so on; and an amplifying mechanism section comprising a balancing chamber into which the pulsating air pressure is introduced so as to cause the fluid in the main chamber to vibrate, a second diaphragm, a third fluid chamber, a second orifice and so on.

8 Claims, 7 Drawing Sheets

FLUID-SEALED TYPE VIBRATION ISOLATING APPARATUS

BACKGROUND OF THE INVENTION

1. Field of the Invention

The present invention relates to a fluid-sealed type vibration isolating apparatus having an electromagnetic oscillator, and more particularly to a fluid-sealed type vibration isolating apparatus in which a vibration isolating mechanism section which is to be connected to a vibrating body and has an insulator, a fluid chamber and so on, and a vibrating mechanism section having an electromagnetic oscillator and so on for propagating a pulsating air pressure composed of duty waves (pulse waves) to a balancing chamber constituting the vibration isolating mechanism section, are so provided as to be separated from each other.

2. Description of the Prior Art

Among vibration isolating apparatus, the ones used in engine mounts for automobile and the like must be able to deal with a wide range of frequencies, because engines which are power sources are used under various conditions from the idle running to the maximum rotational speed. Moreover, recently, tuning of engine mounts has been conducted for the purpose of cutting of muffled noise caused by the vibrations in a relatively high frequency band. In order to cope with these plural conditions, there already has been a fluid-sealed type vibration isolating apparatus with an oscillator invented. The apparatus comprises an internal fluid chamber and, further, an electromagnetic oscillator provided in this fluid chamber to vibrate at a specified frequency. For example, Japanese Patent Unexamined Publication No. 9-49541 discloses such a fluid-sealed type vibration isolating apparatus with an oscillator.

In the above-described conventional apparatus, a vibration isolating mechanism section comprising an insulator, a fluid chamber and so on is integrally formed with a vibrating mechanism section comprising a coil and so on, and the vibrating isolating apparatus constructed as described above is installed between an engine which is a vibrating body and a chassis frame member. In the apparatus having such construction, if it is intended to increase the force produced by the oscillator, there arises a problem that the vibration isolating apparatus has to be increased in size as a whole such as to increase the coil in diameter, length and so on. However, the vibration isolating apparatus of this type should be installed between the engine and the chassis frame member, so that the installation space is limited, resulting in the difficulty of increasing the size. Further, it is apprehended that the vibration isolating mechanism section suffers damage from the heat generated from the coil. In order to solve the above problems, it is therefore an object (subject) of the present invention to provide an electromagnetic vibration type fluid-sealed type vibration isolating apparatus in which a vibration isolating mechanism section and a vibrating mechanism section are separated from each other.

SUMMARY OF THE INVENTION

In order to solve the above problems, the following measures are taken in the present invention. In accordance with an aspect of the present invention, there is provided a fluid-sealed type vibration isolating apparatus comprising a first coupling member to be attached to a vibrating body, a second coupling member to be attached to a chassis frame member and the like, an insulator disposed between the first and second coupling members and isolating vibrations from the vibrating body, a main chamber and a sub-chamber in which an incompressible fluid is sealed, an orifice intercommunicating the main chamber and the sub-chamber, a partition plate partitioning the main chamber and the sub-chamber, a diaphragm forming part of the walls of the sub-chamber to separate the sub-chamber from the open air, and an electromagnetic oscillator which causes vibrations so as to make the fluid in the main chamber resonate hydraulically at a specified frequency, wherein a vibration isolating mechanism section which is to be mounted to the vibrating body and comprises the insulator, the fluid chambers, a second diaphragm which is vibrated so as to make the fluid in the fluid chambers resonate hydraulically at a specified frequency, a balancing chamber, and a vibrating mechanism section having an oscillating diaphragm which is operated in such a manner as to propagate air pressure composed of pulsating waves having a specific frequency to the balancing chamber and the electromagnetic oscillator for driving the vibration diaphragm, are so provided as to be separated from each other, and the balancing chamber of the vibration isolating mechanism section and an air pressure generating chamber of the vibrating mechanism section, in which the vibration diaphragm is provided, are connected with each other by means of a predetermined communication passage.

With the construction described above, the apparatus according to the present invention can have the following effects. Namely, it becomes possible to install the vibrating mechanism section which generates heat when the fluid-sealed type vibration isolating apparatus of this invention is operated, in a suitable position where the air introduced as a result of the running of the automobile causes an improvement in the cooling efficiency. In consequence, the heat generated from the vibrating mechanism section can be reduced, and the heat from the vibrating mechanism section can be prevented from being propagated directly to the vibration isolating mechanism section. Therefore, it becomes possible to take precautions against possible problems concerning the vibration isolating mechanism section such as thermal degradation of the insulator, rise in the dynamic spring constant and so on.

Further, it is possible to increase the size of the oscillator and the like of the vibrating mechanism section required to generate a desired amount of energy. In other words, it becomes possible to install the vibrating mechanism section in a position where there is relatively wide space, thereby making it possible to increase the size of not only the oscillator but also a vibrating coil and the like constituting the oscillator in comparison with the conventional type apparatus that is installed directly to the vibrating body with the vibrating mechanism section and the vibration isolating mechanism section integrated with each other.

In accordance with another aspect of the present invention, the fundamental construction of an apparatus according to this aspect of the invention is identical to that of the above mentioned apparatus. The feature of this apparatus is that a third fluid chamber of which part of the walls is formed by the second diaphragm is provided adjacently to the second diaphragm constituting the vibration isolating mechanism section, and a second orifice is provided between the third fluid chamber and the main chamber continuous to the insulator so that the fluid in the second orifice is made to resonate hydraulically with the vibrations of the second diaphragm at a specific frequency.

With the construction described above, in the apparatus of this invention, the mass, specifically the volume of the second orifice is so determined that the fluid in the second orifice can resonate with the number of vibrations of the second diaphragm, that is, the number of vibrations (frequency) of the vibration input to the main chamber by the idling vibration, and therefore the pulsating wave introduced into the balancing chamber causes the fluid in the second orifice to resonate, as a result of which the vibrating force is amplified and propagated to the fluid in the main chamber in the form of sine wave. In other words, even if the force generated at the balancing chamber and the second diaphragm is small, the vibrating force propagated to the fluid in the main chamber becomes large and takes the form of sine wave. In consequence, fluctuations in fluid pressure in the main chamber caused by the vibration originating from the idling and propagated into the main chamber can be absorbed efficiently, thereby making it possible to hold down the dynamic spring constant of the whole vibration isolating mechanism section for the idling vibration. By holding down the dynamic spring constant in this way, the idling vibration can be cut off.

In accordance with another aspect of the present invention, the fundamental structure of an apparatus according to this aspect of the invention is also identical with that of the above mentioned apparatus. The feature of this apparatus is that the oscillator for driving the vibrating diaphragm which is operated in such a manner as to propagate the air pressure composed of pulsating waves to the balancing chamber of the vibration isolating mechanism section, comprises a movable piece which is operated integrally with the vibration diaphragm and a vibration coil which drives the movable piece and receives a duty signal (pulse signal) from a duty signal generator unit provided separately, and an air pressure generating chamber is provided around the vibration diaphragm which is operated integrally with the movable piece in response to the driving force from the vibration coil. With the construction described above, in the apparatus of this invention, it becomes possible to surely obtain a desired pulsating pressure (pulsating wave) with a simple construction.

In accordance with another aspect of the present invention, the fundamental structure of an apparatus according to this aspect of the invention is identical with that of the above mentioned apparatus. The feature of this apparatus resides in that a temperature sensor is attached to the electromagnetic oscillator constituting the vibrating mechanism section, and the duty factor (pulse duty factor) of the duty signal to be input into the electromagnetic oscillator is controlled appropriately based on a signal from the temperature sensor, in addition to the feature of the above mentioned apparatus.

With the construction described above, the apparatus of this invention can have the following effect. Namely, in the apparatus of this aspect of the invention, if the heat generated from the oscillator causes the generated magnetic force to become weak during the operation of the oscillator, it is possible to prevent the reduction in moving force of the movable piece and the vibration diaphragm linked integrally therewith by adjusting (controlling) the duty factor (pulse duty factor).

In accordance with another aspect of the present invention, the fundamental structure of an apparatus according to this aspect of the invention is also identical with that of the above mentioned apparatus. Namely, in addition to the above mentioned fluid-sealed type vibration isolating apparatus, at the air pressure generating chamber constituting the vibrating mechanism section, the balancing chamber constituting the vibration isolating mechanism section or the communication passage communicating the air pressure generating chamber and the balancing chamber, provided is a fine air passage for regulating the pressure through which no air is allowed to flow when the vibration diaphragm constituting the vibrating mechanism section is operated.

With the construction described above, in the apparatus of this invention, it becomes possible to suppress the fluctuations in static air pressure in the air pressure generating chamber or the communication passage attributed to the change in fluid pressure in the fluid chamber of the vibration isolating mechanism section upon mounting an engine, fluctuations in ambient atmospheric pressure or the like. Incidentally, the fine communication air passage of this invention has a very small diameter, so that the pulsating air pressure generated when the vibrating mechanism section is operated can be prevented from leaking. Namely, it is possible to show the function of cutting off the dynamic pressure. Therefore, the pulsating air pressure produced in the air pressure generating chamber is propagated regularly to the balancing chamber of the vibration isolating mechanism section.

In accordance with another aspect of the present invention, the fundamental structure of an apparatus according to this aspect of the invention is also identical with that of the above mentioned apparatus. The feature of this apparatus is the construction of the fine air passage (fine communication passage) which is provided for the purpose of compensating for the deviation of the neutral position of the vibration diaphragm upon the static pressure variation. Namely, in addition to the above mentioned fluid-sealed type vibration isolating apparatus, between two air pressure generating chambers formed on both sides of the vibration diaphragm constituting the vibrating mechanism section provided is a fine communication passage through which the two air pressure generating chambers are communicated with each other so as to make the pressures therein become equal only when the vibration diaphragm is not operated.

With the construction described above, the apparatus of this invention can have the following effects. Specifically, the static air pressure is allowed to come to equilibrium between the two air pressure generating chambers. In consequence, when the vibrating mechanism section of this invention is not operated, the neutral position of the vibration diaphragm can be ensured at all times. In addition, in the apparatus of this invention, the fine communication passage for absorbing the static pressure fluctuation is not of the open air type, and therefore it becomes possible to prevent rainwater, dust and so on from intruding through the fine communication passage.

In accordance with another aspect of the present invention, the fundamental structure of an apparatus according to this aspect of the invention is also identical with that of the apparatus. The feature of this apparatus is the concrete construction of the fine communication passage. Namely, in addition to the above mentioned fluid-sealed type vibration isolating apparatus, the fine communication passage comprises a circumferential passage formed in an outer peripheral portion of a rubber diaphragm portion forming the vibration diaphragm and passage portions formed in members fixing the outer peripheral portion of the rubber diaphragm portion forming the vibration diaphragm and contributing to the formation of the air pressure generating chambers on both sides of the vibration diaphragm, the passage portions being connected to an end of the circumferential passage portion at one ends thereof and to the air pressure generating chambers at the other ends thereof, respectively.

With the construction described above, in the apparatus of this invention, it becomes possible to provide the fine communication passage for maintaining the neutral condition (neutral position) of the vibration diaphragm inside the vibrating mechanism section, thereby making it possible to make the vibrating mechanism section compact as a whole. Further, the fine communication passage of this invention is provided around the vibration diaphragm formed in airtight, and therefore it becomes unnecessary to fear the intrusion of rainwater, dust and so on from the outside, with the result that it becomes possible to ensure the reliability of the whole apparatus.

In accordance with another aspect of the present invention, the fundamental structure of an apparatus according to this aspect of the invention is also identical with that of the above mentioned apparatus. The feature of this apparatus resides in addition to the above mentioned fluid-sealed type vibration isolating apparatus, the fine communication passage is formed in a disk-shaped holding member which fix a rubber diaphragm portion at a portion thereof adjacent to the center and which is coupled to the movable shaft, the fine communication passage having a predetermined length and being connected to the two air passage generating chambers at opposite ends thereof.

With the construction described above, in the apparatus of this invention as well, since the number of parts can be reduced, it becomes possible to reduce the weight and the production costs of the vibrating mechanism section in the same way as the above mentioned apparatus. Finally, it becomes possible to reduce the weight and the production costs of the whole fluid-sealed type vibration isolating apparatus of this invention.

DESCRIPTION OF THE PREFERRED EMBODIMENT

Figure 1:
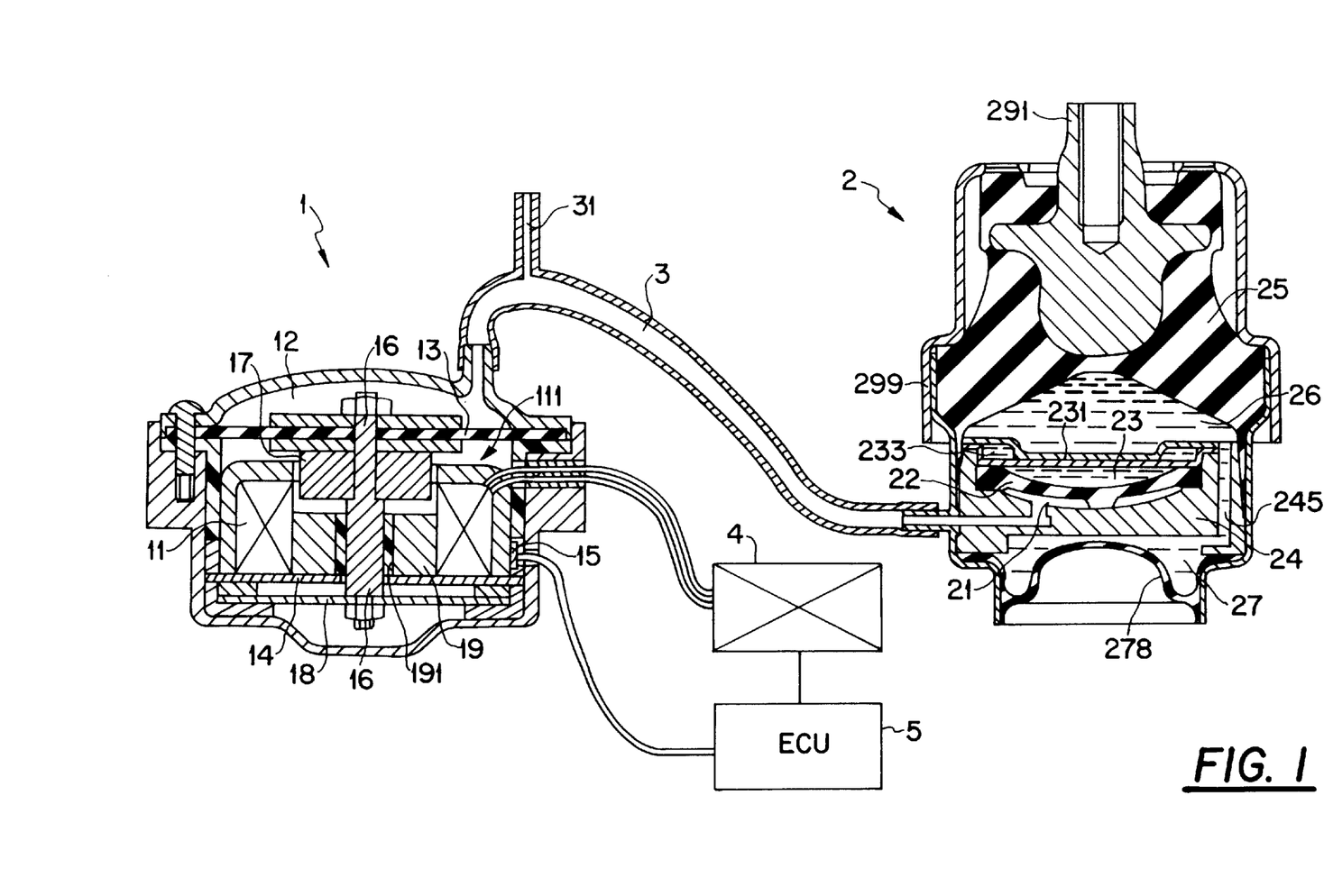
FIG. 1 is a sectional view showing the general construction of the present invention.

Preferred embodiments of the present invention will be described by referring to FIGS. 1 to 8. As shown in FIG. 1, a fluid-sealed type vibration isolating apparatus according the present invention essentially comprises a vibration isolating mechanism section 2, a vibrating mechanism section 1, a duty signal generator unit 4, a control unit 5, and a communication passage 3. The vibration isolating mechanism section 2 is mounted on a vibrating body and fulfills the function of cutting off and absorbing vibrations transmitted mainly from the vibrating body such as an engine. The vibrating mechanism section 1 operates to cause a fluid in a fluid chamber constituting the vibration isolating mechanism section 2 to resonate hydraulically at a specific frequency. The duty signal generator unit 4 operates to input a duty signal having a specific frequency into an oscillator 111 constituting the vibrating mechanism section 1. The control unit 5 controls the duty factor (pulse duty factor) of the duty signal supplied from the duty signal generator unit 4 so as to be decided suitably on the basis of a signal from a temperature sensor 15 attached to the oscillator 111. The communication passage 3 is made of an air hose, an air tube or the like and communicates an air pressure generating chamber 12 of the vibrating mechanism section 1 with a balancing chamber 21 of the vibration isolating mechanism section 2.

In the apparatus having the construction described above, as shown in FIGS. 1 and 5, the vibrating mechanism section 1 essentially comprises air pressure generating chambers 12, 12', a vibration diaphragm 13, and the oscillator 111. The air pressure generating chambers 12, 12' are provided on both sides of a vibration diaphragm 13 for propagating an air pressure composed of pulsating waves through the communication passage 3 to the vibration isolating mechanism section 2. The vibration diaphragm 13 is so provided as to separate the both air pressure generating chambers 12, 12' from each other and generates the pulsating air pressure having a specified frequency in the air pressure generating chamber 12. The oscillator 111 vibrates the vibration diaphragm 13 at a specified frequency. Further, the oscillator 111 basically comprises a vibration coil (solenoid coil) 11, a ring-shaped stator iron core 19, a movable shaft 16, a movable iron piece 18 and a return spring 18. The vibration coil (solenoid coil) 11 is mounted on a base 14 and is energized in response to the signal from the duty signal generator unit 4. The ring-shaped stator iron core 19 is provided inside the vibration coil 11 and is mounted on the base 14. The movable shaft 16 is provided inside the ring-shaped stator iron core 19 with a magnetic shielding member 191 interposed between them in such a manner that it can relatively move with respect to the stator iron core 19 and the vibration coil (solenoid coil) 11. The movable iron piece 17 is provided at an upper portion of the movable shaft 16 as an integral part thereof. The movable iron piece 17 is driven by the vibration coil (solenoid coil) 11 and is operated integrally with the vibration diaphragm 13. The return spring 18 gives force to the movable shaft 16 against the driving force from the vibration coil (solenoid coil) 11 so as to help the vibration diaphragm 13 to return to its neutral position.

Further, in the apparatus constructed as described above, a fine air passage 31 defined by a narrow opening is provided to absorb fluctuations in static air pressure at the communication passage 3, as shown in FIG. 1. The fine air passage may be provided at the air pressure generating chamber 12 or the balancing chamber 21. The fine air passage 31 has a diameter of about 1 mm and a length of about 10 cm. The return spring 18 is basically a leaf spring in the shape of a disk or a spider, the center of which is connected to a lower end portion of the movable shaft 16 (see FIG. 1), to an upper portion thereof (see FIG. 5) or to the both thereof, and a ring portion at the peripheral edge of which is fixed to the peripheral portion of the base 14 or the like.

Figure 4:
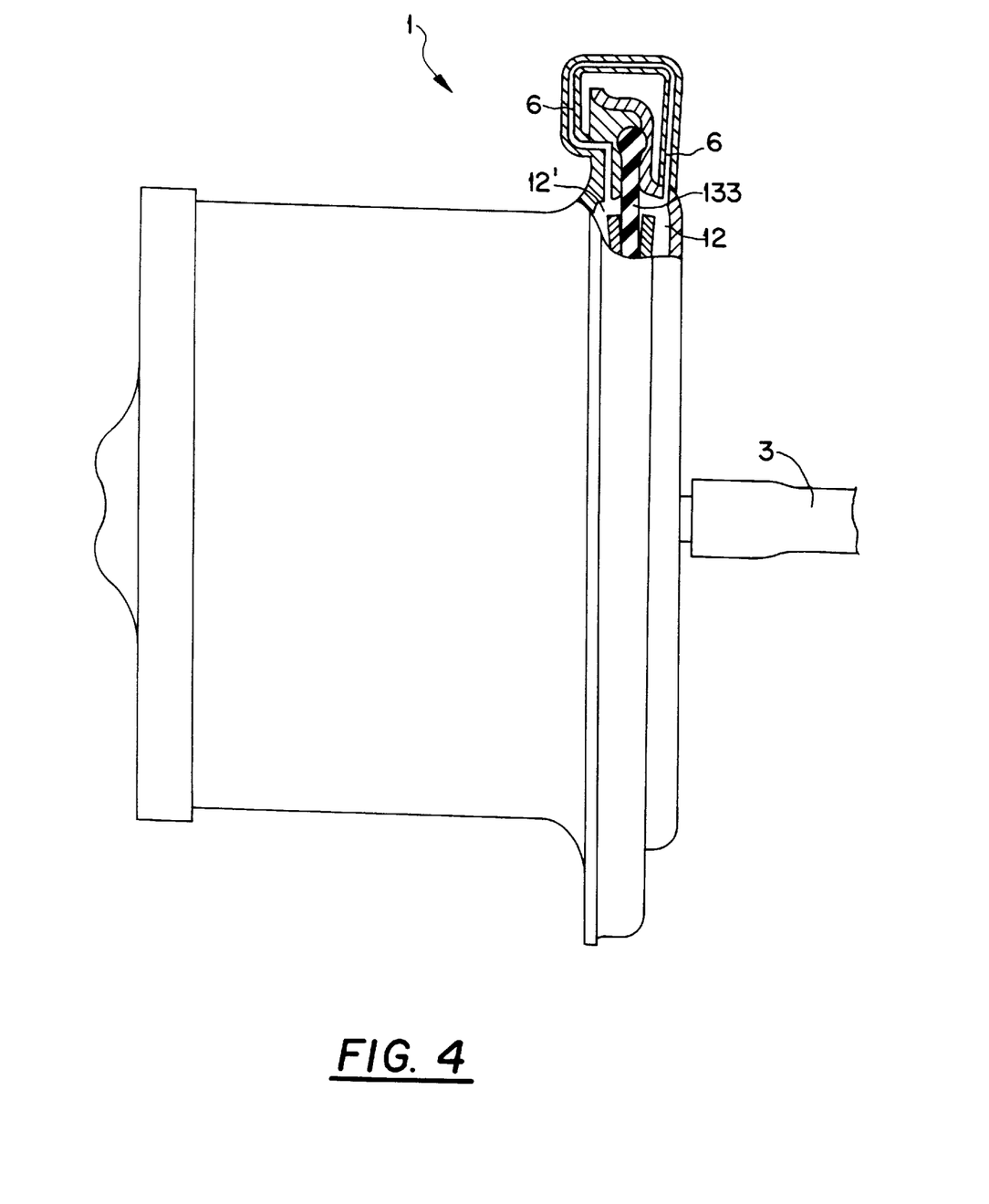
FIG. 4 is an illustration showing the whole structure of an embodiment of the invention in which a fine communication passage is provided between two air pressure generating chambers as means for returning a vibration diaphragm to a neutral position upon static pressure variation.

Incidentally, instead of the open air type fine air passage 31 mentioned above, fine communication passages 6 shown in FIGS. 4 to 8 are given as the mechanism for absorbing fluctuations in static air pressure (static pressure), each of which is provided so as to balance the static pressure between the two air pressure generating chambers 12, 12'. Generally, input of static load at the time of mounting an engine, fluctuations in applied load caused by the operation of auxiliary devices and the like or other reason will result in the application of a static pressure from the vibration isolating mechanism section 2 to the portion of the air pressure generating chambers 12, 12', which is close to the vibration isolating mechanism section. In these embodiments shown in FIGS. 4 to 8, however, the input static pressure is allowed to escape to the air pressure generating chamber 12' on the opposite side through the action of the fine communication passage 6, and finally the pressures between the both air pressure generating chambers 12, 12' are balanced. In consequence, the vibration diaphragm 13 is allowed to automatically return to the neutral condition (neutral position). And, in this condition, when the vibration diaphragm 13 starts to operate, a pulsating air pressure is generated by the operation of the vibration diaphragm 13 and, at the same time, the fine communication passage 6 exhibits the stopping function for the dynamic pressure, since it is very small in diameter like the fine air passage 31. Therefore, the generated pulsating air pressure (pulsating wave) is propagated through the communication passage 3 to the balancing chamber 21 of the vibration isolating mechanism section 2. First, as an example of such mechanism, there is given a fine communication passage 6 which is defined by a fine tube member provided outside the vibrating mechanism section 1 so as to make the both air pressure generating chambers 12, 12' formed on opposite sides of the vibration diaphragm 13 communicate with each other, as shown in FIG. 4. With such construction, the both air pressure generating chambers 12, 12' and the fine communication passage 6 become airtight, thereby eliminating the need to fear the intrusion of rainwater, dust and so on.

Secondarily, as other examples, there are given fine communication passages 6 each of which is provided inside the vibrating mechanism section 1, particularly around the vibration diaphragm 13 constituting the vibrating mechanism section 1, as shown in FIGS. 5 to 8. With these constructions, by providing the fine communication passage 6 around the vibration diaphragm 13, it becomes possible to assure the space-saving and the reduction in the number of parts. Among these ones, a fine communication passage 6 shown in FIG. 5 comprises three passage portions, namely, a semicircular passage portion formed in the outer peripheral portion of a rubber diaphragm portion 133 forming the vibration diaphragm 13 so as to extend for almost halfway round and two straight line-shaped passage portions formed at opposite ends of the semicircular passage portion, that is, a case-side passage portion 61 communicating with one air pressure generating chamber 12' adjacent to a case 129 and a cover-side passage portion 62 communicating with the other air pressure generating chamber 12 connected to the vibration isolating mechanism section 2 by means of the communication passage 3. In this way, the fine communication passage 6 is provided around the vibration diaphragm 13 by using various parts in common, and therefore it becomes possible to reduce the number of parts, with the result that the production costs can be reduced and the weight of the whole apparatus can be decreased.

Figure 6:
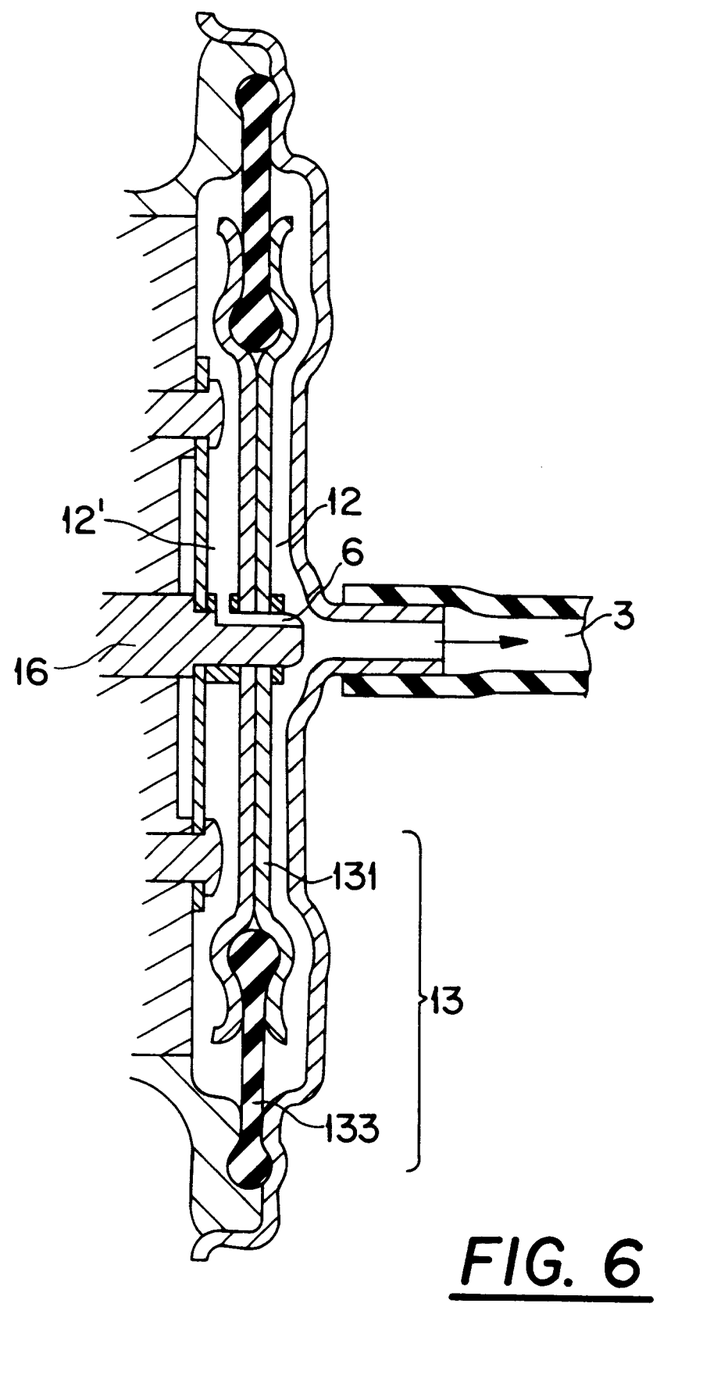
FIG. 6 is a sectional view showing the whole structure of an embodiment in which a fine communication passage is provided in a movable shaft which drives the vibration diaphragm.

Further, as another example of the type that is provided inside the vibrating mechanism section 1, there is given a fine communication passage 6 which is defined by a slit groove or the like formed in an upper end portion of the movable shaft 16, on which the vibration diaphragm 13 is fitted, so as to make the both air pressure generating chambers 12, 12' communicate with each other, as shown in FIG. 6. With this one, by forming the fine communication passage 6 as an integral part of the movable shaft 16, it becomes possible to decrease the mass or to reduce the production costs.

Figure 5:
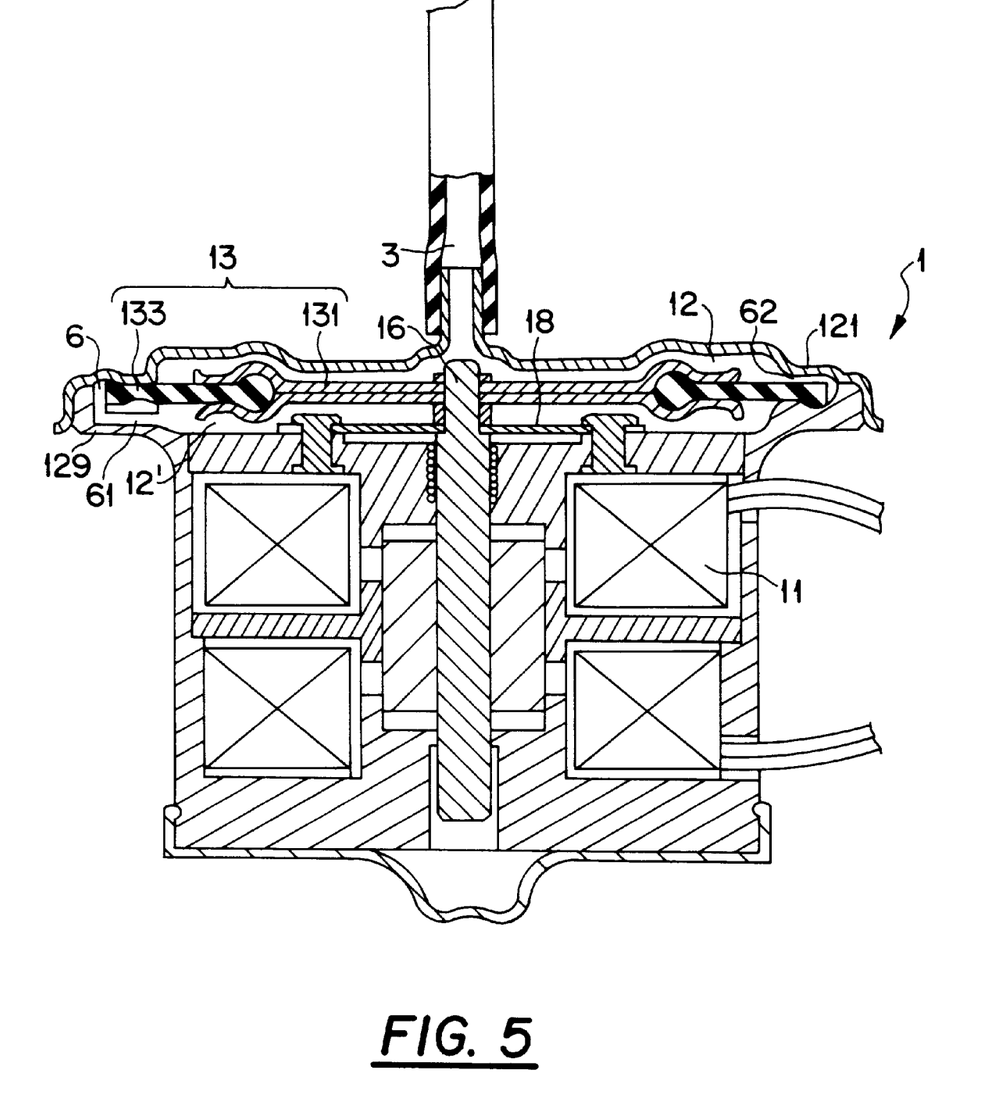
FIG. 5 is a sectional view showing the structure of an embodiment in which a fine communication passage is provided in the outer peripheral portion of a rubber diaphragm portion forming the vibration diaphragm.
Figure 7:
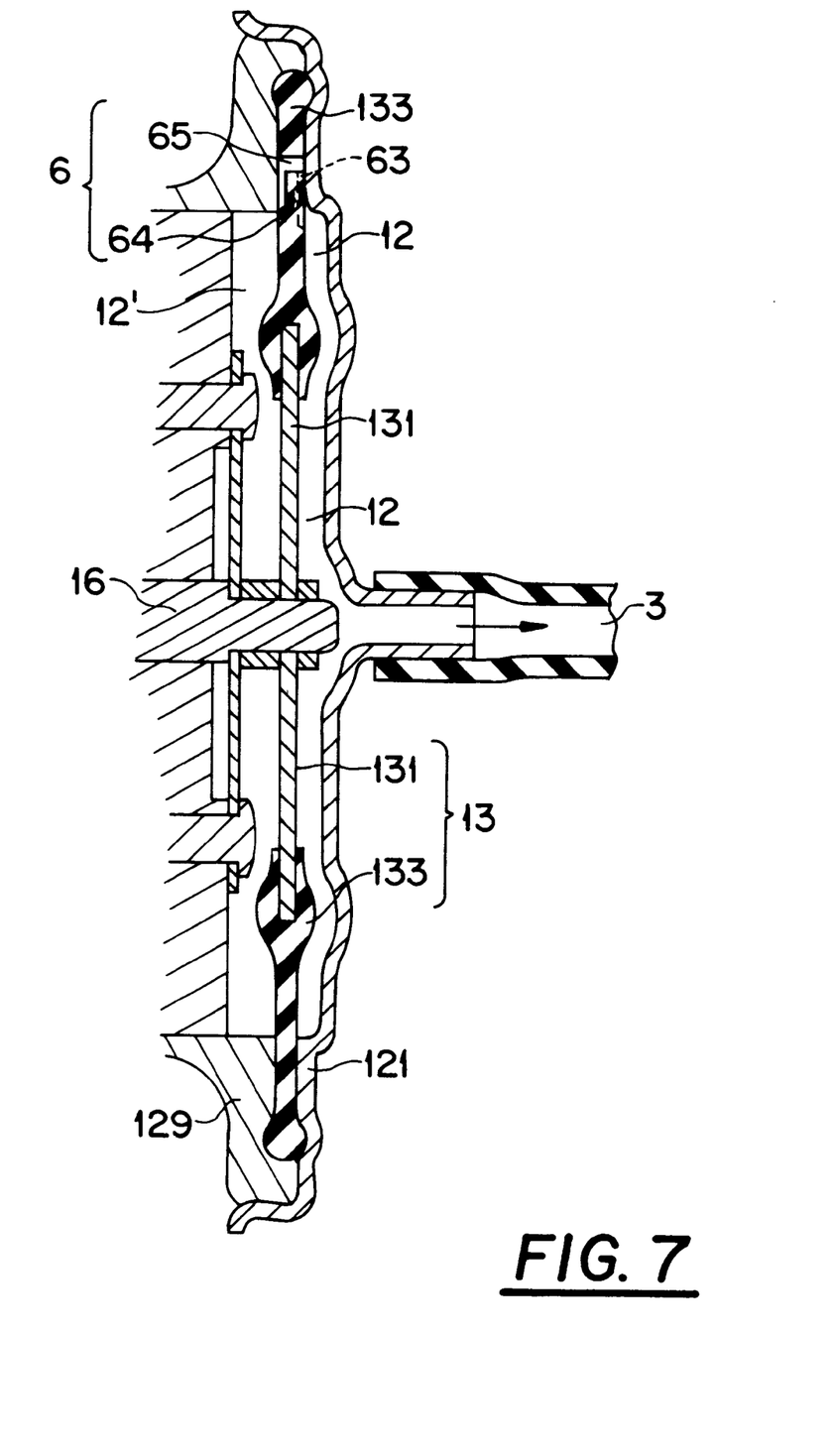
FIG. 7 is a sectional view showing the whole structure of an embodiment in which a fine communication passage is provided in the rubber diaphragm portion forming the vibration diaphragm.

In addition, there is given a fine communication passage 6 which is provided in the rubber diaphragm portion 133 constituting the vibration diaphragm 13 and has a predetermined length, as shown in FIG. 7, for example. This fine communication passage 6 is formed in that portion of the rubber diaphragm portion 133 which is in contact with the case 129 and the cover 121. More specifically, as shown in FIG. 7, the fine communication passage 6 comprises groove-type passage portions 63, 64 formed in the opposite surfaces of the rubber diaphragm portion 133 so that they are in the shape of an arc or the like having a predetermined length, and a through hole 65 formed in the groove-type passage portions 63, 64 so as to penetrate the rubber diaphragm portion 133. Incidentally, as a coupling structure by which the rubber diaphragm portion 133 provided with such fine communication passage 6 is joined at the portion thereof adjacent to the center to a disk-shaped holding member 131, there is also considered the one in which, as shown in FIG. 7, the outer peripheral portion of the disk-shaped holding member 131 is inserted in and bonded to a circumferential groove formed in the inner peripheral edge portion of the rubber diaphragm portion 133 with a vulcanizing adhesion means or the like so as to integrate both the disk-shaped holding member 131 and the rubber diaphragm 133 in addition to the other type in which the rubber diaphragm portion 133 is firmly held between two disk-shaped holding members 131, as shown in FIGS. 5, 6 and 8.

Figure 8:
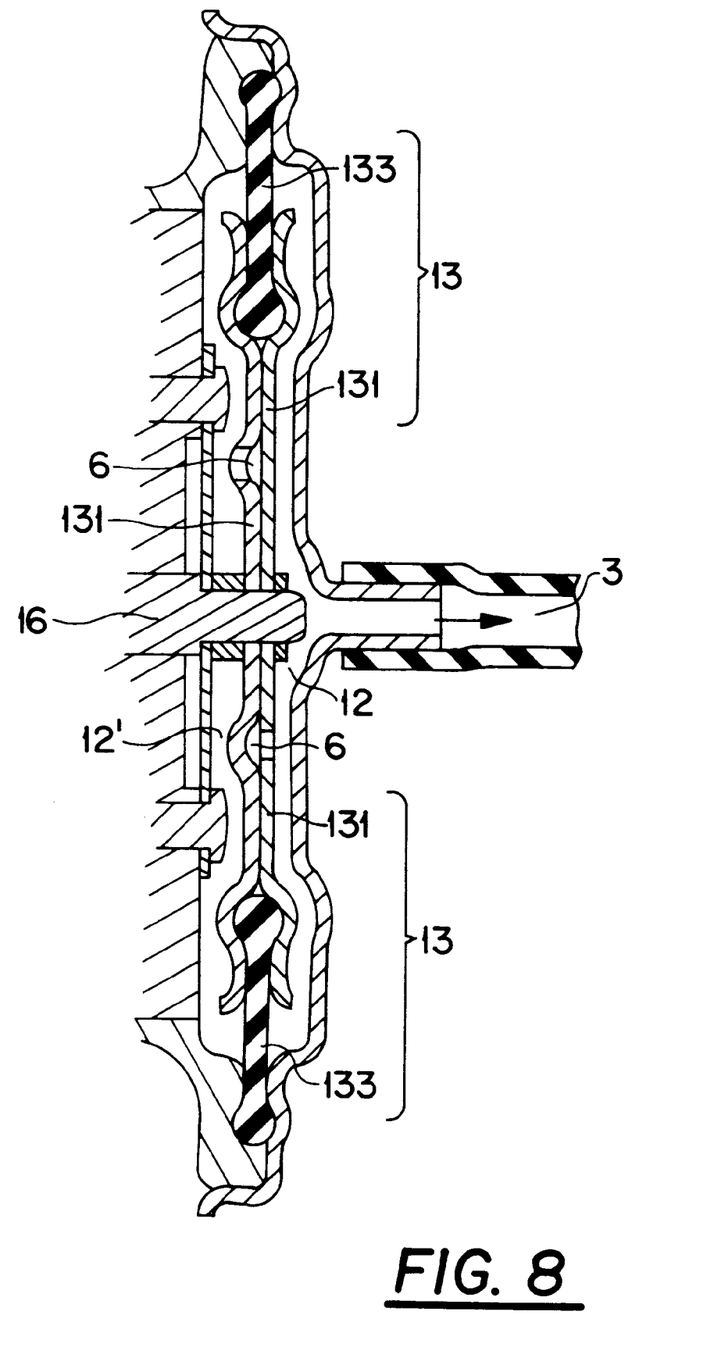
FIG. 8 is a sectional view showing the whole structure of an embodiment in which a fine communication passage is provided in disk-shaped holding members forming the vibration diaphragm.

Moreover, as shown in FIG. 8, there is given a fine communication passage 6 having a predetermined length and provided in the disk-shaped holding member 131 which is coupled on the movable shaft 16 at the center thereof and by which the rubber diaphragm portion 133 is held at the portion thereof adjacent to the center. More specifically, as shown in FIG. 8, the fine communication passage 6 comprises openings formed in suitable positions in the two disk-shaped holding members 131 so as to be communicated with the air passage generating chambers 12, 12', and a beaded communication passage having a predetermined length and formed in at least one of the two disk-shaped holding members 131 so as to connect the openings.

Any of the examples constructed as described above (see FIGS. 5 to 8) requires no special parts for forming the fine communication passage 6, and therefore it becomes possible to make sure of the lightweight and the reduction in the production costs owing to the decrease in the number of parts. Further, they can be formed in the closed space defined by the case 129 and the cover 121, so that it becomes unnecessary to fear the intrusion of rainwater, dust and so on, thereby making it possible to improve the reliability of the vibrating mechanism section 1.

Into the vibration coil 11 by which the vibrating mechanism section 1 is driven and which constitutes the oscillator 111, a duty signal having a specified frequency is input from the duty signal generator unit 4 provided separately, as shown in FIG. 1. Further, the vibration coil 11 is provided with the temperature sensor 15 which measures the temperature around the vibration coil 11 and sends out the measured data to the control unit 5. And, based on the signal (data) from the temperature sensor 15, the duty factor (pulse duty factor) of the duty signal sent out from the duty signal generator unit 4 is controlled suitably. The control unit 5 for performing such control operation comprises a microcomputer composed mainly of a microprocessor unit (MPU). This microcomputer has a table which is mapped with correction values that raise the duty factor (pulse duty factor) of the duty signal generated from the duty signal generator unit 4 so as to compensate for the decrement of generated magnetic force attributed to the temperature rise of the vibration coil 11 when it is operated (see FIGS. 2 and 3). Based on the mapped data (data of ROM), the control unit 5, when receives a signal (data) from the temperature sensor 15, controls the duty factor (pulse duty factor) of the duty signal from the duty signal generator unit 4.

The vibration isolating mechanism section 2 which is operated when applied with the pulsating air pressure from the vibrating mechanism section 1 constructed as described above, essentially comprises a coupling fitting 291 to be connected to the vibrating body such as the engine, a holder 299 to be connected to the chassis frame member or the like, an insulator 25 made of a rubber material and disposed between the coupling fitting 291 and the holder 299, a main chamber 26 and a sub-chamber 27 arranged in series with respect to the insulator 25 and having an incompressible fluid sealed therein, a first orifice 245 communicating the main chamber 26 with the sub-chamber 27, a partition plate 24 separating the main chamber 26 and the sub-chamber 27 from each other, and a diaphragm (first diaphragm) 278 forming part of the walls of the sub-chamber 27 to separate it from the open air.

In the vibration isolating mechanism section 2 constructed as described above, as shown in FIG. 1, between the partition plate 24 and the main chamber 26 provided is an amplifying mechanism into which the pulsating air pressure produced in the vibrating mechanism section 1 is introduced through the communication passage 3 and which finally vibrates the fluid in the main chamber 26 at a specified frequency. More specifically, the amplifying mechanism comprises the balancing chamber 21 defined above the partition plate 24 and communicated with the air pressure generating chamber 12 of the vibrating mechanism section 1 through the communication passage 3 in air tight fashion, a second diaphragm 22 forming part of the balancing chamber 21 and dividing it from a third fluid chamber 23, the third fluid chamber 23 formed between the second diaphragm 22 and the main chamber 26, and second orifice 233 communicating the third fluid chamber 23 with the main chamber in such a manner that the fluid is allowed to flow between the main chamber 26 and the third fluid chamber 23. Further, a rigid partition wall 231 is provided between the main chamber 26 and the third fluid chamber 23, and the second orifice 233 is integrally and annularly formed in the peripheral portion of the partition wall 231. The second orifice 233 constructed as described above has a predetermined capacity so that the fluid in the second orifice 233 resonates with the vibration of the second diaphragm 22 vibrating in pulsation at a specific frequency, thereby finally causing the fluid in the main chamber 26 to vibrate.

Next, as to the function of these embodiments constructed as described above, the description will be presented by referring to FIG. 1. First, for the idling vibration, a duty signal having a predetermined frequency is input into the vibration coil 11 constituting the oscillator 111 so as to cause the oscillator 111 to vibrate at a specified frequency. Therefore, the movable iron piece 17 and the movable shaft 16 and the vibration diaphragm 13 operated integrally with the movable iron piece 17, which all constitute the oscillator 111, are actuated so as to produce (generate) a pulsating wave of air pressure in the air pressure generating chamber 12 constituting the vibrating mechanism section 1. The air pressure composed of pulsating waves thus generated is propagated through the communication passage 3 to the balancing chamber 21 of the vibration isolating mechanism section 2, thereby vibrating the second diaphragm 22. Accordingly, the fluid in the third fluid chamber 23 is caused to vibrate. Then, the vibration of the fluid in the third fluid chamber 23 is further propagated through the second orifice 233 to the fluid in the main chamber 26. In the present embodiment, the mass, specifically the volume of the second orifice 233 is determined so that the number of vibration of the fluid in the second orifice 233 resonates with that of the second diaphragm 22, that is, the number of vibration (frequency) of the vibration input by the idling vibration into the main chamber 26. Therefore, the pulsating waves introduced into the balancing chamber 21 cause the fluid in the second orifice 233 to resonate, as a result of which the vibrating force is amplified and propagated to the fluid in the main chamber 26 in the form of sine wave. In other words, even if the force generated at the balancing chamber 21 and the second diaphragm 22 is small, the vibrating force propagated to the fluid in the main chamber 26 becomes large and takes the form of sine wave. In consequence, fluctuations in fluid pressure in the main chamber 26 caused by the idling vibration and propagated into the main chamber 26 can be absorbed efficiently, thereby making it possible to hold down the dynamic spring constant of the whole vibration isolating mechanism section 2 for the idling vibration. By holding down the dynamic spring constant in this way, the idling vibration can be cut off.

Figure 2:
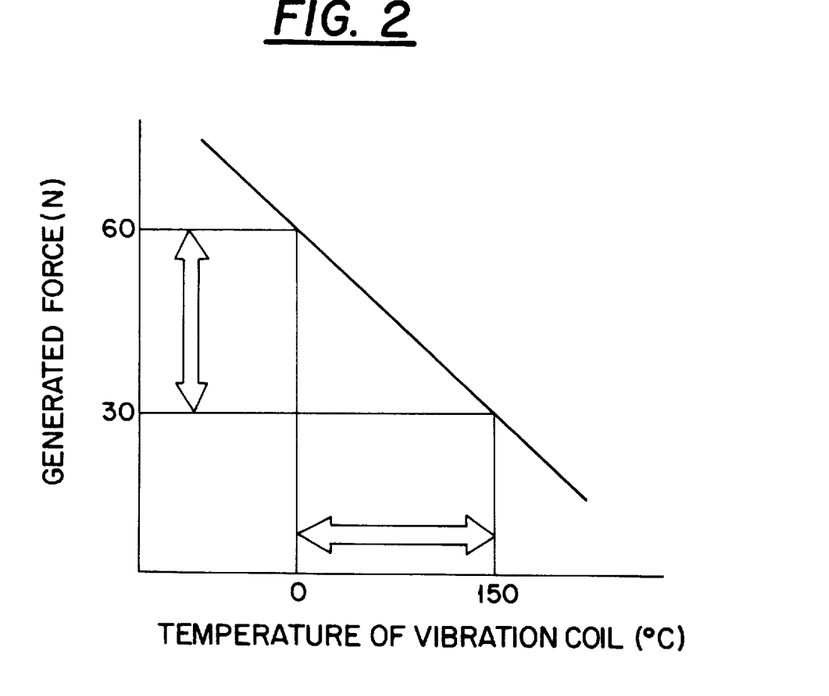
FIG. 2 is a graph showing the relationship between the temperature change of the vibration coil portion and the change in generated magnetic force associated with the temperature change in the present invention.
Figure 3:
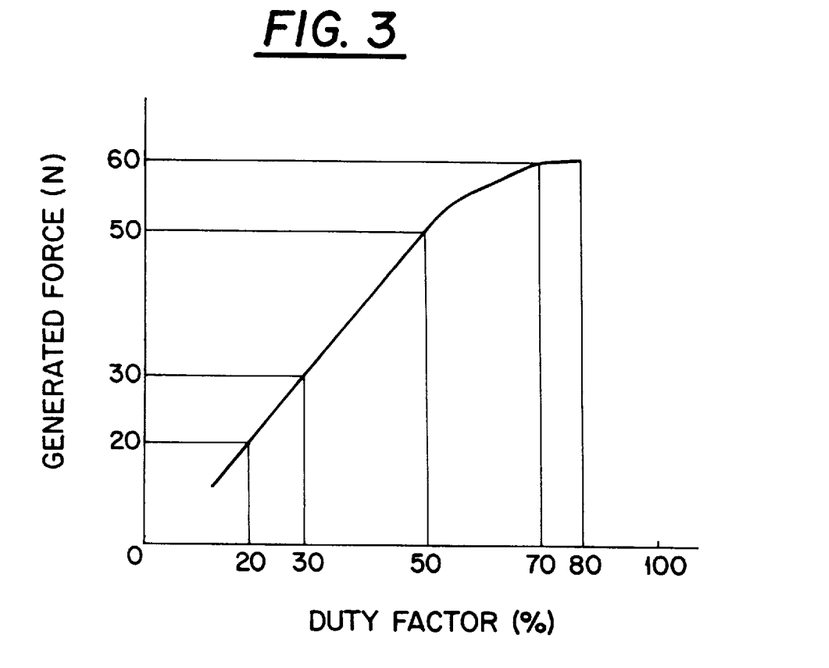
FIG. 3 is a graph showing the relationship between the duty factor (pulse duty factor) and the generated magnetic force in the oscillator in the present invention.

While cutting off the idling vibration, the present embodiment shows a further function as follows. Namely, in the present embodiment, even if there is a possibility that, when the oscillator 111 is actuated, the heat generated therefrom causes the generated magnetic force to become weak, it is possible to prevent the reduction in moving force of the movable iron piece 17 as well as of the movable shaft 16 and the vibration diaphragm 13 linked integrally therewith by adjusting (controlling) the duty factor (pulse duty factor). Generally, in the electromagnetic oscillator, heat is generated at and around the vibration coil portion as a result of the electromagnetic induction, thus giving rise to a problem that the generated magnetic force is weakened. To cope with this, in the present embodiment, the oscillator 111 is provided with the temperature sensor 15 so as to compensate for the decrement in generated magnetic force attributed to the temperature rise by controlling the duty factor (pulse duty factor) based on the signal from the temperature sensor 15. More specifically, in order to compensate for the decrement in magnetic force accompanying the temperature rise as shown in FIG. 2, the duty factor (pulse duty factor) is controlled appropriately so as to be increased as shown in FIG. 3. In consequence, the pulsating pressure produced at the vibration diaphragm 13 can be prevented from fluctuating, and therefore the air pressure composed of steady pulsating waves can be applied constantly to the balancing chamber 21 of the vibration isolating mechanism section 2. Accordingly, the energy propagated through the third fluid chamber 23 and the second orifice 233 to the main chamber 26 can be ensured sufficiently, with the result that the dynamic spring constant of the whole vibration isolating mechanism section 2 for the idling vibration of the engine can be reduced satisfactorily.

In order to cut off the vibration caused by the engine shaking and having a frequency lower than that of the idling vibration, the damping factor is increased so as to suppress the vibration, thereby performing the function of cutting off or isolating vibrations. For this purpose, it is necessary that the fluid pressure in the main chamber 26 be raised sufficiently against the vibration caused by the engine shaking and propagated through the insulator 25 to the main chamber 26. Therefore, in the present embodiment, as shown in FIG. 1, no electric current is allowed to flow into the vibration coil 11 constituting the vibrating mechanism section 1, thereby preventing the oscillator 111 from being actuated. In such condition, even if the low frequency vibration caused by the engine shaking is propagated into the main chamber 26 through the insulator 25 constituting the vibration isolating mechanism section 2, the capacity in the main chamber 26 does not change immediately after propagation of the engine shaking, because the rigid partition wall 231 is provided at the bottom portion in the main chamber 26 so as to separate the main chamber 26 from the third fluid chamber 23. In consequence, the fluid pressure in the main chamber 26 is raised, so that the fluid in the main chamber 26 flows to the sub-chamber 27 through the first orifice 245 through which the fluid is allowed to flow easily. Accordingly, it becomes possible to obtain an excellent damping characteristic (high damping factor), and therefore the low frequency vibration such as engine shaking can be suppressed. Namely, cutting off the engine shaking can be performed.

According to the present invention, with the construction described above, it becomes possible to install the vibrating mechanism section which generates heat when operated, in a suitable position where the cooling efficiency can be improved owing to the air introduced as a result of the running of the automobile and so on. In consequence, it becomes possible to reduce the amount of heat generated from the vibrating mechanism section. Further, the heat from the vibrating mechanism section can be prevented from being propagated directly to the vibration isolating mechanism section, thereby making it possible to take precautions against possible problems concerning the vibration isolating mechanism section such as thermal degradation of the insulator, rise in the dynamic spring constant and so on.

Further, according to the present invention, the vibration isolating mechanism section which is to be installed between the vibrating body and the chassis frame member and the like and the vibrating mechanism section serving as the energy generating source are provided separately from each other and are connected to each other by means of the air pressure communication passage which is an energy transmission means, and therefore it becomes possible to increase the size of the oscillator and so on of the vibrating mechanism section required to generate a desired amount of energy. In other words, it becomes possible to install the vibrating mechanism section in a position where there is relatively wide space, thereby making it possible to increase the size of the vibration coil and the like constituting the oscillator.

Moreover, according to the present invention, the signal to be input into the oscillator is a duty signal and the duty factor (pulse duty factor) of the duty signal is increased in response to an amount of heat from the vibration coil produced when the oscillator is operated (increment in temperature), and therefore the force generated at the vibration diaphragm can be prevented from being weakened. Namely, the decrement in generated magnetic force resulting from the temperature rise can be compensated for by controlling the duty factor (pulse duty factor) on the basis of the signal from the temperature sensor attached to the oscillator, and therefore the pulsating pressure produced at the vibration diaphragm can be prevented from fluctuating and hence the air pressure composed of steady pulsating waves can be applied constantly to the balancing chamber of the vibration isolating mechanism section. In consequence, the energy to be propagated to the main chamber of the vibration isolating mechanism section can be ensured sufficiently, resulting in that the dynamic spring constant of the whole vibration isolating mechanism section for the engine idling vibration can be reduced satisfactorily. This makes it possible to cut off the idling vibration.

In addition, according to the construction in which the fine communication passage communicating the two air pressure generating chambers is provided as means for coping with fluctuations in static pressure, the whole system can be formed in a closed structure, so that it becomes unnecessary to fear the intrusion of rainwater, dust and so on into the vibrating mechanism section. In consequence, it becomes possible to enhance the reliability of the vibrating mechanism section. Further, with the constructions in which the fine communication passage of such closed type is provided in various parts constituting the vibration diaphragm, the number of parts can be reduced and hence the mass of the vibrating mechanism section can be decreased and moreover the production costs thereof can be reduced.

What is claimed is:

1. A fluid-sealed type vibration isolating apparatus comprising:

a first coupling member to be fixed to a vibrating body;

a second coupling member to be attached to a chassis frame member and the like;

an insulator disposed between said first and second coupling members and cutting off vibrations from said vibrating body;

a fluid chamber comprising a main chamber and a sub-chamber in which an incompressible fluid is sealed;

an orifice intercommunicating said main chamber and said sub-chamber;

a partition plate partitioning said main chamber and sub-chamber;

a diaphragm forming part of the walls of said sub-chamber and separating said sub-chamber from the open air; and an electromagnetic oscillator which causes vibrations so as to make the fluid in said main chamber resonate hydraulically at a specified frequency, wherein a vibration isolating mechanism section which is to be mounted to the vibrating body and which comprises the insulator, the fluid chamber, a second diaphragm which is vibrated so as to make the fluid in said fluid chamber resonate hydraulically at a specified frequency and a balancing chamber, and a vibrating mechanism section having a vibration diaphragm which is operated in such a manner as to propagate an air pressure composed of pulsating waves having a specific frequency to said balancing chamber and the electromagnetic oscillator for driving said vibration diaphragm, are separately provided, and said balancing chamber of the vibration isolating mechanism section and an air pressure generating chamber of the vibrating mechanism section in which said vibration diaphragm is provided, are connected with each other by means of a communication passage.

2. A fluid-sealed type vibration isolating apparatus according to claim 1, wherein a third fluid chamber is provided adjacent to said second diaphragm constituting said vibration isolating mechanism section so that part of the walls thereof is formed by said second diaphragm, and a second orifice is provided between said third fluid chamber and the main chamber contiguous to said insulator so that the fluid in said second orifice is made to resonate hydraulically with the vibration of said second diaphragm at a specific frequency.

3. A fluid-sealed type vibration isolating apparatus according to claim 1, wherein the oscillator for driving the vibration diaphragm which is operated in such a manner as to propagate the air pressure composed of pulsating waves to the balancing chamber of said vibration isolating mechanism section, comprises a movable piece which is operated integrally with said vibration diaphragm and a vibration coil which drives said movable piece and receives a duty signal from a duty signal generator unit provided separately, and the air pressure generating chamber is provided around the vibration diaphragm which is operated integrally with said movable piece in response to the driving force from said vibration coil.

4. A fluid-sealed type vibration isolating apparatus according to claim 3, wherein a temperature sensor is attached to the electromagnetic oscillator constituting said vibrating mechanism section, and the duty factor of the duty signal to be input into said electromagnetic oscillator is controlled appropriately on the basis of a signal from said temperature sensor.

5. A fluid-sealed type vibration isolating apparatus according to claim 1, wherein one of the air pressure generating chamber constituting said vibrating mechanism section, the balancing chamber constituting the vibration isolating mechanism section and the communication passage intercommunicating said air pressure generating chamber and said balancing chamber, is provided with a fine air passage for regulating the pressure through which no air is allowed to flow when the vibration diaphragm constituting said vibrating mechanism section is operated.

6. A fluid-sealed type vibration isolating apparatus according to claim 1, wherein a fine communication passage is provided between two air pressure generating chambers formed on both sides of the vibration diaphragm constituting said vibrating mechanism section, said fine communication passage intercommunicating said two air pressure generating chambers so as to make the pressures therein become equal only when said vibration diaphragm is not operated.

7. A fluid-sealed type vibration isolating apparatus according to claim 6, wherein said fine communication passage comprises a circumferential passage portion formed in an outer peripheral portion of a rubber diaphragm portion forming said vibration diaphragm and passage portions formed in members which fix outer peripheral portion of the rubber diaphragm portion and which contribute to the formation of the air pressure generating chambers on both sides of said vibration diaphragm, said passage portions being respectively connected to ends of said circumferential passage portion at one ends thereof and to the air pressure generating chambers at the other ends.

8. A fluid-sealed type vibration isolating apparatus according to claim 6, wherein said fine communication passage is formed in a disk-shaped holding member to which a rubber diaphragm portion forming said vibration diaphragm is fixed at a portion thereof adjacent to the center, said fine communication passage having a predetermined length and being connected to said two air pressure generating chambers at opposite ends thereof.

* * * * *